(12) United States Patent
Damsi et al.

(10) Patent No.: US 9,555,698 B2
(45) Date of Patent: Jan. 31, 2017

(54) RETRACTABLE TOP COVERING MECHANISM

(71) Applicant: Tarpstop, LLC, Perrysburg, OH (US)

(72) Inventors: Everest Damsi, Perrysburg, OH (US); Kenneth R. Weschke, Jr., Perrysburg, OH (US)

(73) Assignee: Tarpstop, LLC, Perrysburg, OH (US)

( * ) Notice: Subject to any disclaimer, the term of this patent is extended or adjusted under 35 U.S.C. 154(b) by 0 days.

(21) Appl. No.: 15/064,681

(22) Filed: Mar. 9, 2016

(65) Prior Publication Data

US 2016/0263978 A1 Sep. 15, 2016

Related U.S. Application Data

(60) Provisional application No. 62/130,390, filed on Mar. 9, 2015.

(51) Int. Cl.
*B60J 11/02* (2006.01)
*B60P 7/04* (2006.01)

(52) U.S. Cl.
CPC . *B60J 11/02* (2013.01); *B60P 7/04* (2013.01)

(58) Field of Classification Search
CPC .................................... B60J 11/02; B60P 7/04

USPC .............................................. 296/98, 100.12
IPC .......................................................... B60P 7/04
See application file for complete search history.

(56) References Cited

U.S. PATENT DOCUMENTS

| 3,942,830 A | * | 3/1976 | Woodard | ................ | B60J 7/062 |
| | | | | | 296/100.12 |
| 6,142,554 A | * | 11/2000 | Carroll | .................... | B60J 7/062 |
| | | | | | 296/100.11 |

* cited by examiner

*Primary Examiner* — Joseph D Pape
(74) *Attorney, Agent, or Firm* — MacMillan, Sobanski & Todd, LLC

(57) ABSTRACT

A retractable top covering system has a top covering configured to cover an open top area of a container having sides that define an interior space. The top covering is connected to a retractable top drive mechanism that selectively retracts and deploys the retractable top covering. A track is supported along an upper edge of the container around a portion of the open top area. The track supports at least one trolley for relative movement along the upper edge of the container. A support bow is connected the trolley and supports the retractable top covering. A cable, connected between the retractable top drive mechanism and the trolley, moves the trolley along the track in response to retraction and deployment action of the retractable top drive mechanism.

20 Claims, 6 Drawing Sheets

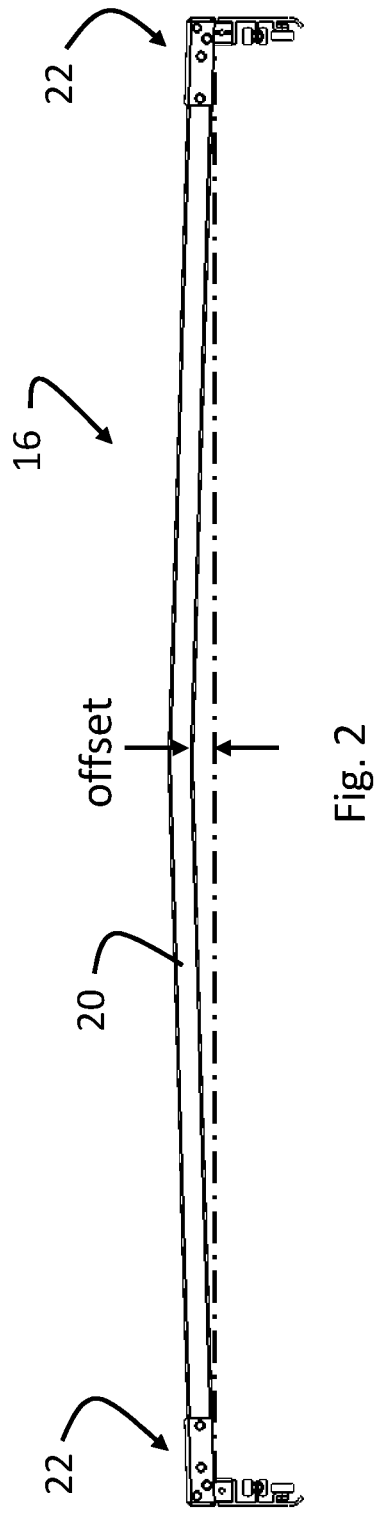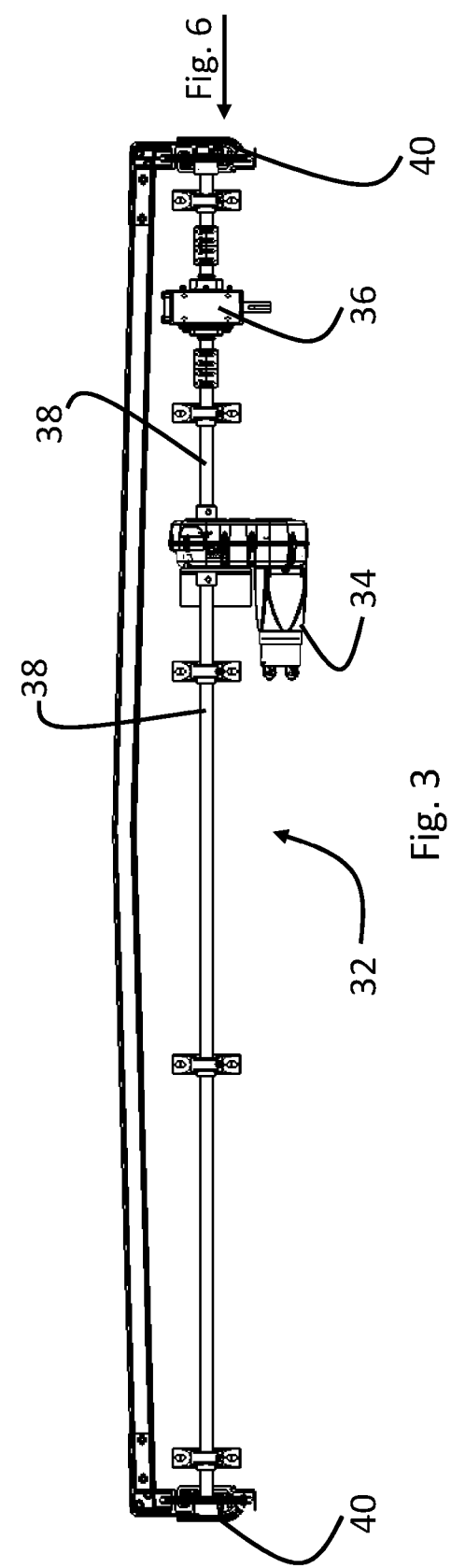

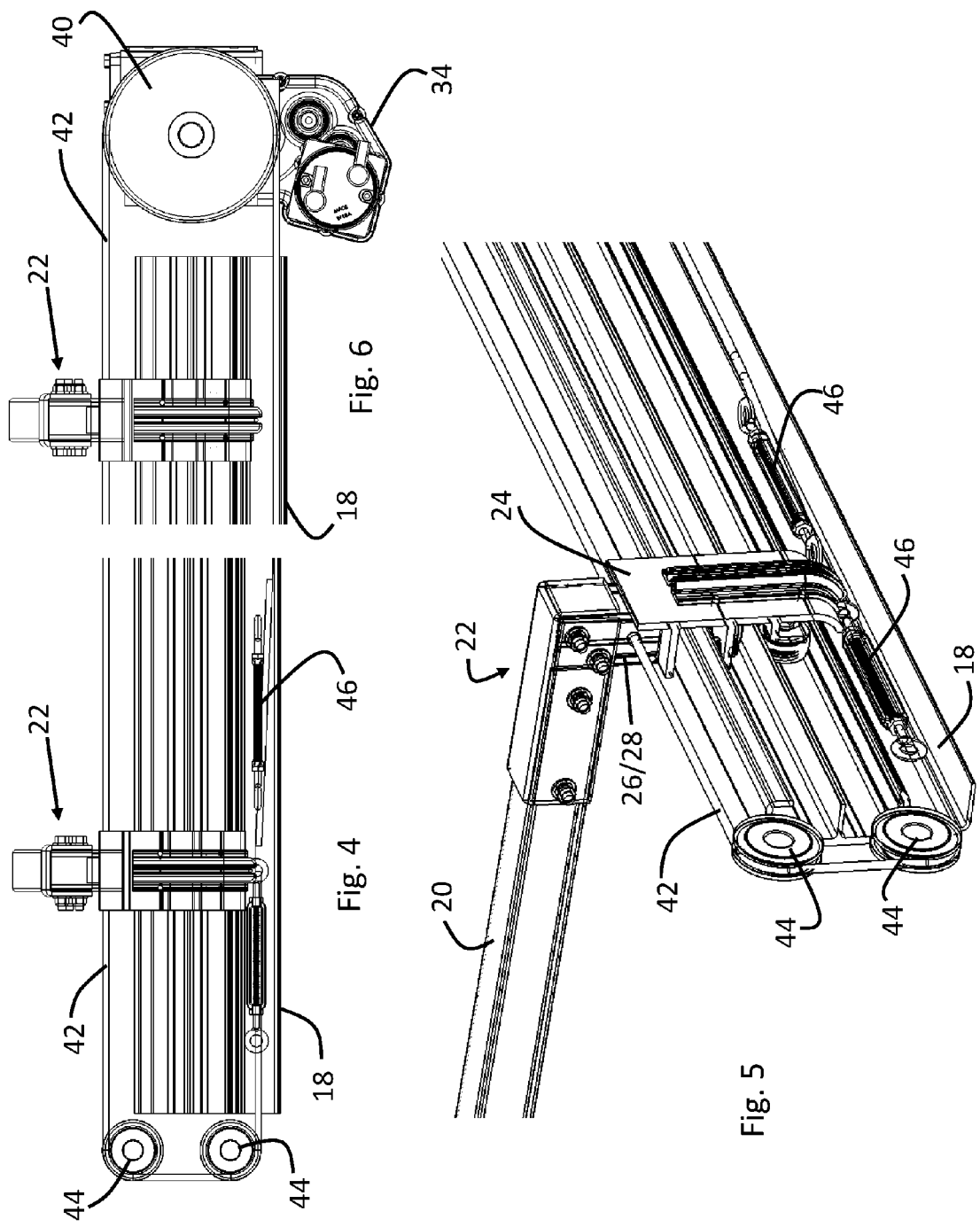

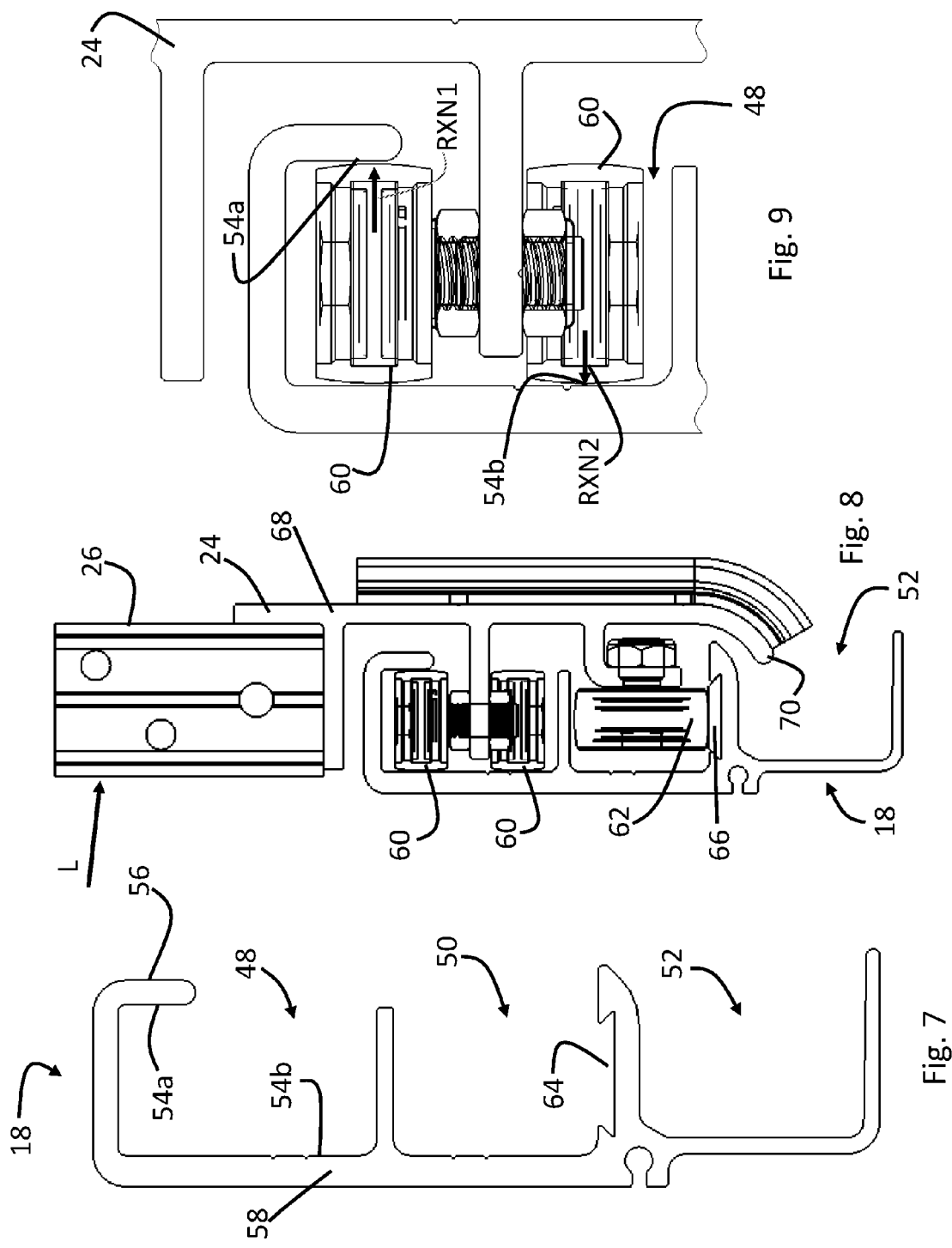

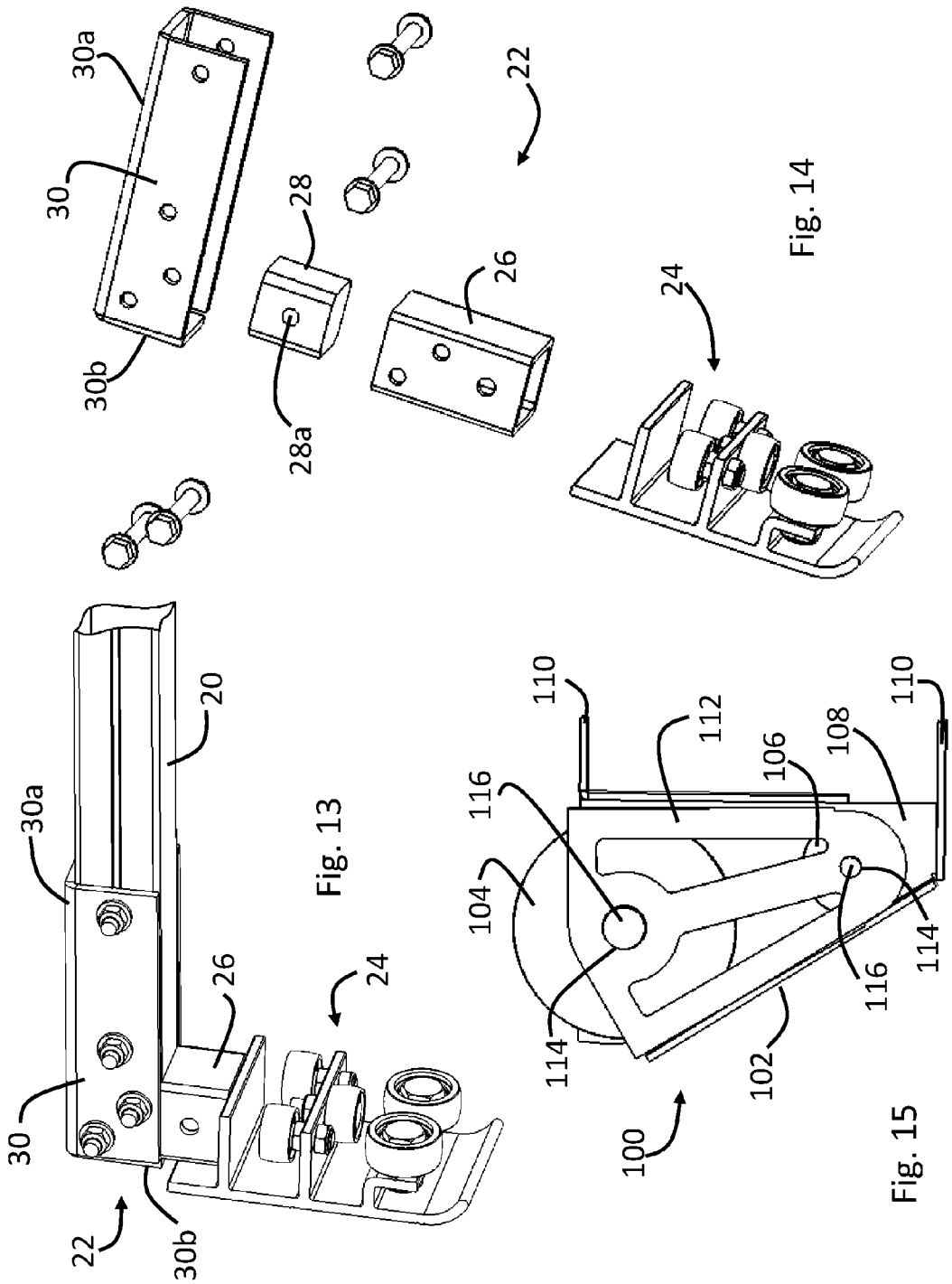

RETRACTABLE TOP COVERING MECHANISM

CROSS-REFERENCE TO RELATED APPLICATIONS

This application claims the benefit of U.S. Provisional Application No. 62/130,390, filed Mar. 9, 2015, the disclosure of which is incorporated herein by reference.

BACKGROUND OF THE INVENTION

This invention relates in general to covering systems used in tractor-trailer hauling applications. In particular, this invention relates to a power actuated top covering system for selectively covering the open top area of a trailer having rigid side walls.

Commercial truck trailers are produced in a variety of forms to support and haul a variety of goods. Flat bed trailers are designed to haul heavy loads, such as coiled steel or larger pieces of equipment, and permit these loads to be placed on the trailer surface easily. Box trailers tend to haul lighter packaged goods that need to be protected from wind loads during transport. Open top, dump trailers configured to haul generally loose and dry goods, such as grain, sand, gravel and the like, have generally rigid side walls and a rear mounted gate or a bottom-mounted chute or door. The open top permits the goods to be loaded into the trailer. The gate permits goods to be released as the trailer is tilted. The bottom-mounted door permits unloading without the need to tilt the trailer.

Open top dump trailers, because of the loose nature of their cargo, are often covered to prevent road wind from blowing the trailer contents onto the roadway and onto other vehicles following behind. Many states require certain types of loose cargo to be covered to prevent debris from impacting other vehicles. These top coverings may be canvas or rigid panels. Canvas coverings are usually rolled, either to one side or an end of the trailer, to deploy or remove the cover. The rolling mechanism may include a U-shaped "towel" bar that extends along the outer surface of the side walls and pivotally mounts to the lower portion of the trailer. The tarp is rolled onto or off of the towel bar portion that extends across the trailer as the side arms are pivoted. Other types of deployment mechanisms may include a hand operated crank that rotates a take-up bar to roll up the tarp covering. These types of deployment devices are prone to damage because they mount on the exterior of the trailer bed or become cumbersome to operate. Thus, it would be desirable to provide a tarp deployment system for an open top trailer that improves deployment and durability.

SUMMARY OF THE INVENTION

This invention relates to covering systems used in tractor-trailer hauling applications. In particular, this invention relates to a power actuated top covering system for selectively covering the open top area of a trailer having rigid side walls.

A retractable top covering system has a top covering configured to cover an open top area of a container having sides that define an interior space. The top covering is connected to a retractable top drive mechanism that selectively retracts and deploys the retractable top covering. A track is supported along an upper edge of the container around a portion of the open top area. The track supports at least one trolley for relative movement along the upper edge of the container. A support bow is connected the trolley and supports the retractable top covering. A cable, connected between the retractable top drive mechanism and the trolley, moves the trolley along the track in response to retraction and deployment action of the retractable top drive mechanism.

Various aspects of this invention will become apparent to those skilled in the art from the following detailed description of the preferred embodiment, when read in light of the accompanying drawings.

BRIEF DESCRIPTION OF THE DRAWINGS

FIG. 2 is an elevational view of a support bow and trolley assembly.

FIG. 3 is an elevational view of a top actuating assembly.

FIG. 4 is an enlarged side view of an end portion of a track and a top actuating mechanism.

FIG. 5 is a perspective view of the track and actuating mechanism of FIG. 4.

FIG. 6 is an enlarged side view of a driving portion of the track and top actuating mechanism of FIG. 3.

FIG. 7 is an end view of the track of FIGS. 4-6.

FIG. 8 is an end view of a trolley assembly engaging the track of FIG. 7.

FIG. 9 is an enlarged view of a roller support assembly of the track and trolley assembly of FIG. 8.

FIG. 13 is an enlarged, perspective view of an end portion of the support bow and trolley assembly of FIG. 2.

FIG. 14 is an exploded view of a portion of the support bow and trolley assembly of FIG. 13.

FIG. 15 is an enlarged side view of another embodiment of a rear portion of the track and top actuating mechanism of FIG. 4 having a rear pulley module.

DETAILED DESCRIPTION OF THE PREFERRED EMBODIMENT

Figure 1:
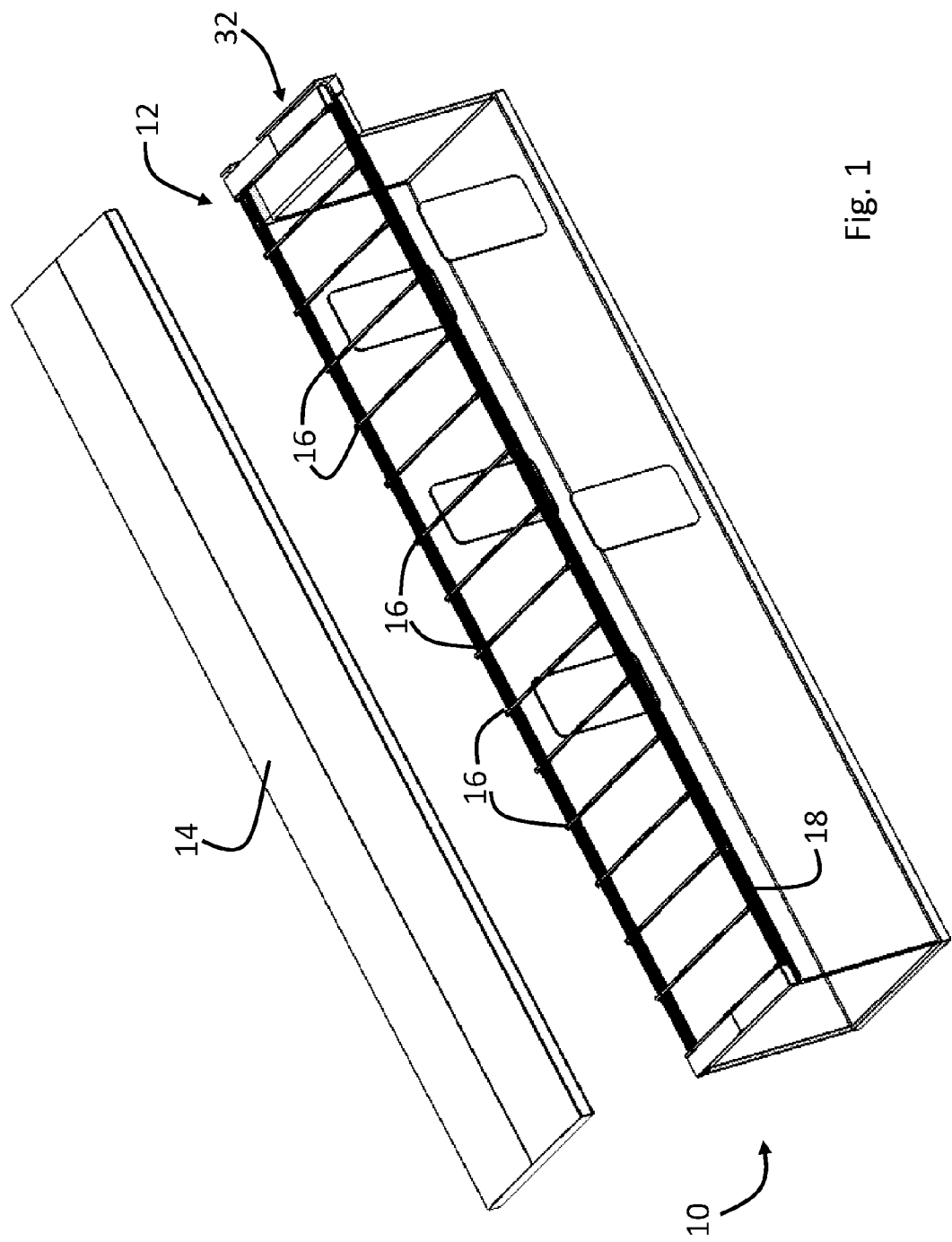
FIG. 1 is an exploded, perspective view of a container having a retractable top cover mechanism in accordance with various embodiments of the invention.
Figure 12:
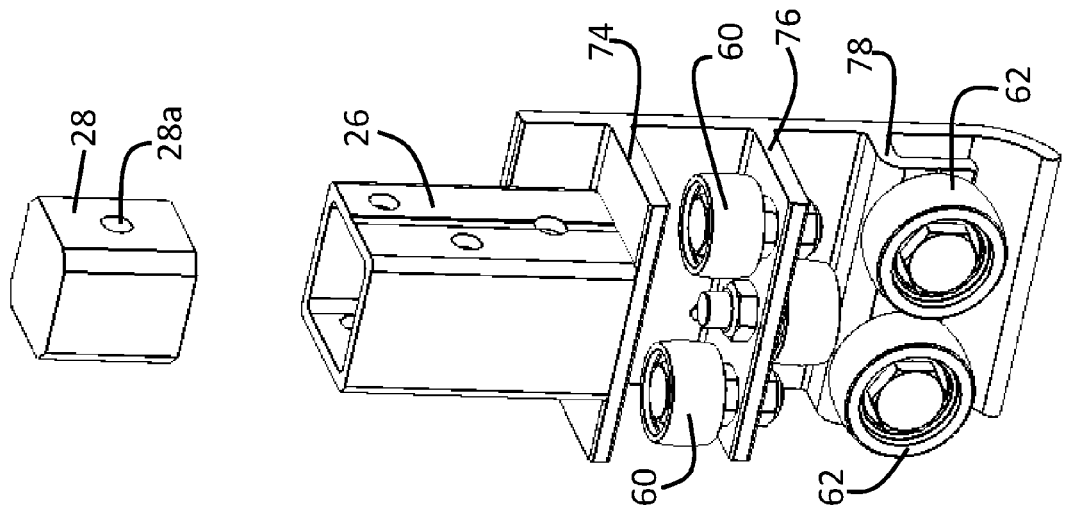
FIG. 12 is an exploded, perspective view of the trolley of FIGS. 10 and 11.
Figure 11:
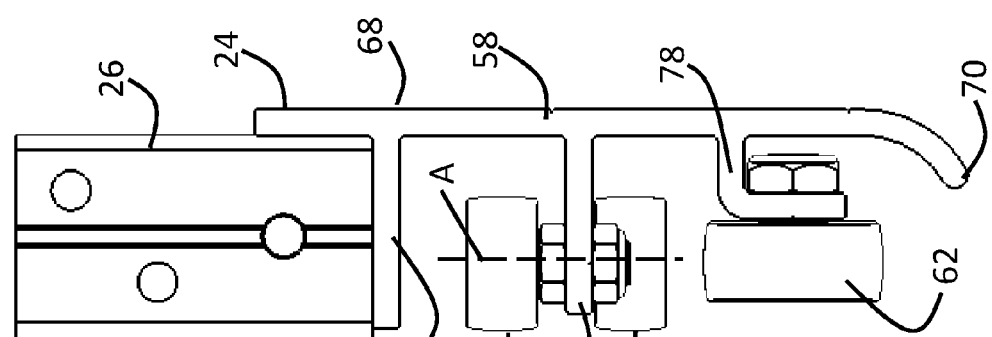
FIG. 11 is an end view of the trolley of FIG. 10.
Figure 10:
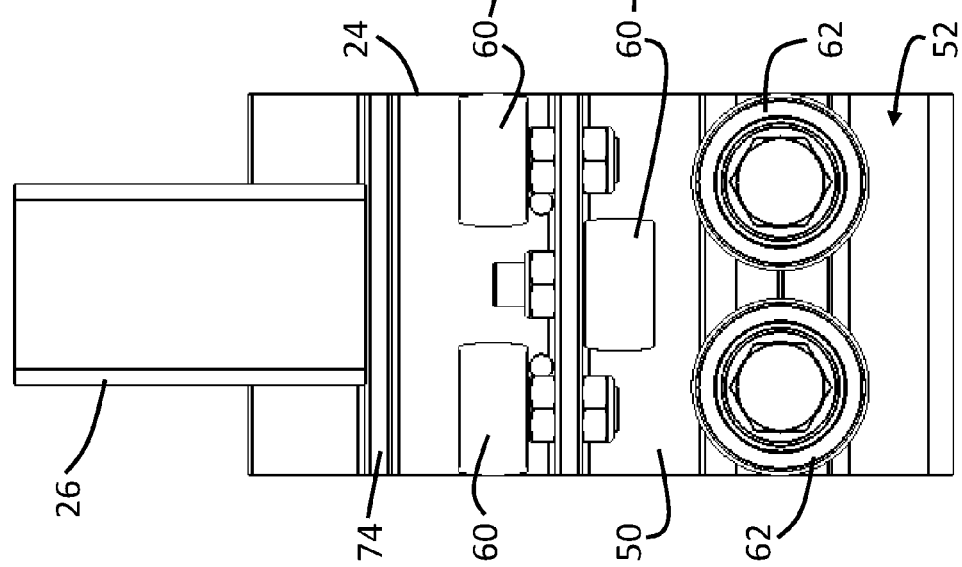
FIG. 10 is a side view of the trolley of FIG. 8.

Referring now to the drawings, there is illustrated in FIG. 1 a container 10 having a retractable top covering mechanism 12. A top cover 14 is shown removed from the container 10. The top cover 14 may be formed as a hard covering structure, such as a segmented series of metal or polymer panels or a soft covering structure, such as a tarp sheet, canvas, or other flexible cover. An example of a single tarp covering 14 is illustrated in FIG. 1. The container 10 may be any type of cargo containment vessel having a generally open top surface, such as for example a dump bed, box container, grain hauler, and the like. The retractable top covering mechanism 12 includes a plurality of support bow and trolley assemblies 16 that span the open top surface of the container. The bow and trolley assemblies 16 are mounted to spaced-apart tracks 18, attached to the sides of the container 10 for relative movement therewith.

FIG. 2 is an end view of the support bow and trolley assembly 16. The bow and trolley assembly 16 includes a support bow 20 that is illustrated as a single member having an offset that defines a sloped surface. The sloped surface permits water runoff and load transfer of environmental loads to trolley assemblies 22 and the track 18. Alternatively, the bow 20 may be two halves, joined by an angled member (not shown) to form the offset. The support bow 20 has trolley assemblies 22 connected at either end to mount and support the bows 20 relative to the tracks 18. As shown in FIGS. 13 and 14, the trolley assembly 22 includes a trolley 24 and bow riser 26. A cable support 28 is disposed within the bow riser 26. A bow bracket 30 connects to the bow riser 26 and includes a bow locating section 30a that locates against the support bow 20. An offset surface 30b locates against the bow riser 26 to define the offset of FIG. 2. The cable support 28 is illustrated as a block shaped support having an aperture 28a formed therethrough. The aperture 28a permits a cable or other actuating structure (i.e., chain, rope, tube, wire, and the like) to connect to the trolley assembly 20. The cable support 28 also permits the cable to be secured to the trolley assembly 20 without substantially distorting the bow riser 26 during attachment or subsequent movement of the structure.

Referring now to FIGS. 1, 3 and 6, a drive assembly 32 is shown that spans the width of the container 10. The drive assembly 32 is illustrated in FIG. 1 as being mounted to the front portion of the container, though such is not required. The drive assembly 32 includes a power drive unit 34 and a manual drive unit 36. The power drive unit 34 is illustrated as a power driven gear box used for powered operation of the top covering 14. The manual drive unit 36 is illustrated as a gear box having an input for non-powered operation by, for example, a hand crank (not shown). A shaft assembly 38 connects the power and manual drive units 34 to drive pulleys 40, shown best in FIG. 6. The drive pulley 40 supports a cable 42 that interconnects the support bow and trolley assemblies 22. As shown in FIG. 4, the cable 42 forms a loop around two spaced apart end pulleys 44. Alternatively, the end pulleys 44 may be any number of pulleys, including a single pulley, similar to drive pulley 40. The ends of the cable 42 are connected together by one or more turnbuckles 46 to provide tensioning adjustment and ease of removal and installation of the cable 42. The turnbuckles 46 may be connected together or connected to one of the trolleys 24.

As shown in FIG. 15, the end pulleys may be configured as part of an end pulley module, shown generally at 100. The end pulley module 100 includes a frame 102 that supports a first end pulley 104 and a second end pulley 106 for rotation. The first end pulley 104 is shown having a larger diameter than the second end pulley 106, though such is not required. The frame 102 includes a pulley housing 108 and a pair of opposed mounting ears 110 extending therefrom that attach to the track 18. The mounting ears 110 may be configured for attachment to the track in either a single position or for adjustability relative to the track 18 to vary tension in the cable 42. The frame 102 further includes a support cover 112. The pulley housing 108 and the support cover 112 include apertures 114 that support axles 116. The pulleys 104 and 106 are supported for rotation on the axles 116.

Referring now to FIGS. 7, 8, and 9; an end view of the track 18 is shown. The track 18 includes a bow reaction channel 48, a track glide channel 50, and a shield channel 52. The bow reaction channel 48 includes spaced apart reaction surfaces 54a and 54b. The reaction surface 54a is formed on a hook 56. The other reaction surface 54b is formed on a back wall 58 of the track 18. The size of the bow reaction channel 48 permits rollers 60 to contact the surfaces 54a and 54b and provide a reacting moment to the bow load, L shown in FIG. 8. In one embodiment, the rollers 60 are each sized to contact only one surface, thus permitting the rollers to counter-rotate as the trolley 24 traverses the container 10.

The track glide channel 50 supports a load roller 62 which carries the weight of the bow and covering section and vertical forces from the environmental loads. The reaction rollers 60 reduce moment loads applied to the load roller 62 in order to create a smooth, reduced effort movement of the trolley 24 against the track 18. In one embodiment, the reaction rollers 60 and the load roller 62 have curved outer surfaces to permit the rollers to maintain a path characterized by a general line-contact pattern. The track glide channel 50 may include a groove 64, illustrated as a dovetail groove, to retain a glide strip 66. The groove 64 may be any shape that accommodates the glide strip 66. The trolley 24 includes a carrier bracket 68 that supports the bow riser 26, the reaction rollers 60 and the load roller 62. The carrier bracket 68 further includes a sealing flange 70 that extends into the shield channel 52 to limit the intrusion of debris and dirt from the road or environment. The carrier bracket 68 includes a top cover mounting channel 72 that supports side portions of the top cover to improve the sealing out of contaminants or retaining cargo particulate within the container.

The carrier bracket 68 includes a bow mounting flange 74 that supports the bow riser 26, which may be welded, or otherwise secured to the trolley 24. A reaction roller mounting flange 76 extends from the back wall 58 and is sized to locate the reaction rollers 60 within the bow reaction channel 48, as described above. A load flange 78 is sized such that the load roller 62 is generally centered under a reaction roller rotational axis, A. This minimizes any moments applied to the load roller 62, which extends the available bearing life associated with the rollers.

In operation of the embodiment of FIG. 1, the tracks 18 are oriented along the upper edge of the container 10, which may be a dump bed, for example. The tarp covering 14, when in the closed position, has side walls or flaps that extend over a portion of the trolley and into the sealing channel. When the top is to be opened, the drive assembly 32 is actuated, either by power or manually, which rotates the shafts 38 and the pulleys 40. The cable 42 is attached to the bow riser, either as a continuous cable or as discrete cable sections between the bow and trolley assemblies, and driven by the pulley 40. The cable 42 passes through the bow risers of the trolleys and may be a slip fit through the aperture 28a. In one embodiment, the bow furthest from the drive pulley and closest to the end pulleys connects the cable ends (at the turnbuckles) such that the cable pulls the last bow into the preceding bows toward the drive unit. The tarp cover then folds or bunches together between the bows exposing the cargo area of the container. The closing operation drives the last bow rearward by reversing the direction of the drive unit and the cable.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A retractable covering system having a top covering configured to cover an open top area of a container having sides that define an interior space, the top covering connected to a retractable top drive mechanism that selectively retracts and deploys the retractable top covering;

a track supported along an upper edge of the container around a portion of the open top area, the track supporting at least one trolley for relative movement along the upper edge of the container, the track including a bow reaction channel and a track glide channel, the trolley having spaced apart reaction rollers that engage the bow reaction channel and a load roller engaging the track glide channel;

a support bow connected to the trolley and supporting the retractable top covering; and a cable connected between the retractable top drive mechanism and the trolley, the cable moving the trolley along the track in response to retraction and deployment action of the retractable top drive mechanism.

2. The retractable top covering system of claim 1 wherein the top covering extends over a portion of the trolley such that the track is substantially covered when the top covering is moved to a closed position over the open top area.

3. The retractable top covering system of claim 1 wherein a bow riser is connected between the trolley and the support bow, the bow riser supports the cable such that movement of the cable is transferred to the trolley.

4. The retractable top covering system of claim 3 wherein a cable support is disposed within the bow riser.

5. The retractable top covering system of claim 1 wherein the spaced apart reaction rollers are mounted on opposite sides of a reaction roller mounting flange that extends from the trolley.

6. The retractable top covering system of claim 5 wherein the trolley includes a load flange to support the load roller.

7. The retractable top covering system of claim 6 wherein the reaction rollers define a reaction roller rotational axis and the load roller is generally centered under the reaction roller rotational axis.

8. The retractable top covering system of claim 1 wherein the track includes a shield channel and the trolley includes a sealing flange that extends into the shield channel.

9. The retractable top covering system of claim 1 wherein the retractable top drive mechanism includes a power drive unit and a manual drive unit.

10. A retractable top covering system having a top covering configured to cover an open top area of a container having sides that define an interior space, the top covering connected to a retractable top drive mechanism that selectively retracts and deploys the retractable top covering;

a track supported along an upper edge of the container around a portion of the open top area, the track supporting at least one trolley for relative movement along the upper edge of the container, the track includes a shield channel and the trolley includes a sealing flange that extends into the shield channel;

a support bow connected to the trolley and supporting the retractable top covering; and a cable connected between the retractable top drive mechanism and the trolley, the cable moving the trolley along the track in response to retraction and deployment action of the retractable top drive mechanism.

11. The retractable top covering system of claim 10 wherein the top covering extends over a portion of the trolley such that the track is substantially covered when the top covering is moved to a closed position over the open top area.

12. The retractable top covering system of claim 10 wherein a bow riser is connected between the trolley and the support bow, the bow riser supports the cable such that movement of the cable is transferred to the trolley.

13. The retractable top covering system of claim 12 wherein a cable support is disposed within the bow riser.

14. The retractable top covering system of claim 10 wherein the track includes a bow reaction channel and a track glide channel, the trolley having spaced apart reaction rollers that engage the bow reaction channel and a load roller engaging the track glide channel.

15. The retractable top covering system of claim 14 wherein the spaced apart reaction rollers are mounted on opposite sides of a reaction roller mounting flange that extends from the trolley.

16. The retractable top covering system of claim 15 wherein the trolley includes a load flange to support the load roller.

17. The retractable top covering system of claim 16 wherein the reaction rollers define a reaction roller rotational axis and the load roller is generally centered under the reaction roller rotational axis.

18. The retractable top covering system of claim 10 wherein the retractable top drive mechanism includes a power drive unit and a manual drive unit.

19. A retractable top covering system comprising:

a track supported along an upper edge of a container and positioned around a portion of an open top area of the container, the track supporting at least one trolley for relative movement along the upper edge of the container, the track including a bow reaction channel and a track glide channel, the trolley having spaced apart reaction rollers that engage the bow reaction channel and a load roller engaging the track glide channel; and a top covering supported by a support bow and configured to selectively cover the open top area of the container, the support bow connected to the trolley.

20. The retractable top covering system of claim 19 wherein the track includes a shield channel and the track glide channel includes a glide strip.

* * * * *